United States Patent [19]

Kaufman

[11] 3,995,339

[45] Dec. 7, 1976

[54] TRANSITION PIECE FOR USE IN INFLATABLE LIFE RAFTS

[76] Inventor: Michael M. Kaufman, 140 S. Park Drive, Massapequa Park, N.Y. 11732

[22] Filed: Aug. 25, 1975

[21] Appl. No.: 607,344

[52] U.S. Cl. .................................................. 9/2 A
[51] Int. Cl.² ........................................ B63B 7/00
[58] Field of Search ................ 9/2 A, 11 A, 310 F, 9/13; 138/89.1, 93, 120, 155; 285/197, 238, 239, 260; 5/365

[56] References Cited

UNITED STATES PATENTS

| 2,639,750 | 5/1953 | Phane ................................... 9/2 A |
| 3,072,930 | 1/1963 | Fraebel ................................. 9/11 A |
| 3,092,854 | 6/1963 | Manhart .............................. 9/11 A |

FOREIGN PATENTS OR APPLICATIONS

| 1,187,835 | 9/1959 | France .................................... 9/2 A |
| 862,278 | 3/1961 | United Kingdom ................... 9/2 A |

*Primary Examiner*—Trygve M. Blix
*Assistant Examiner*—Jesus D. Sotelo
*Attorney, Agent, or Firm*—James J. Romano, Jr.

[57] ABSTRACT

A transition piece for use in the generally perpendicular joinder of the tubular components of an inflatable life raft is provided and comprises a generally tubular body portion terminating at one extremity in an integral, generally circular attachment flange of generally concave cross section which includes an aperture formed generally centrally thereof to mate with a like aperture in a tubular life raft component to provide for fluid communication through the transition piece between the tubular components joined thereby upon inflation of the life raft. Formation of the transition piece by injection moulding from neoprene rubber is contemplated.

5 Claims, 5 Drawing Figures

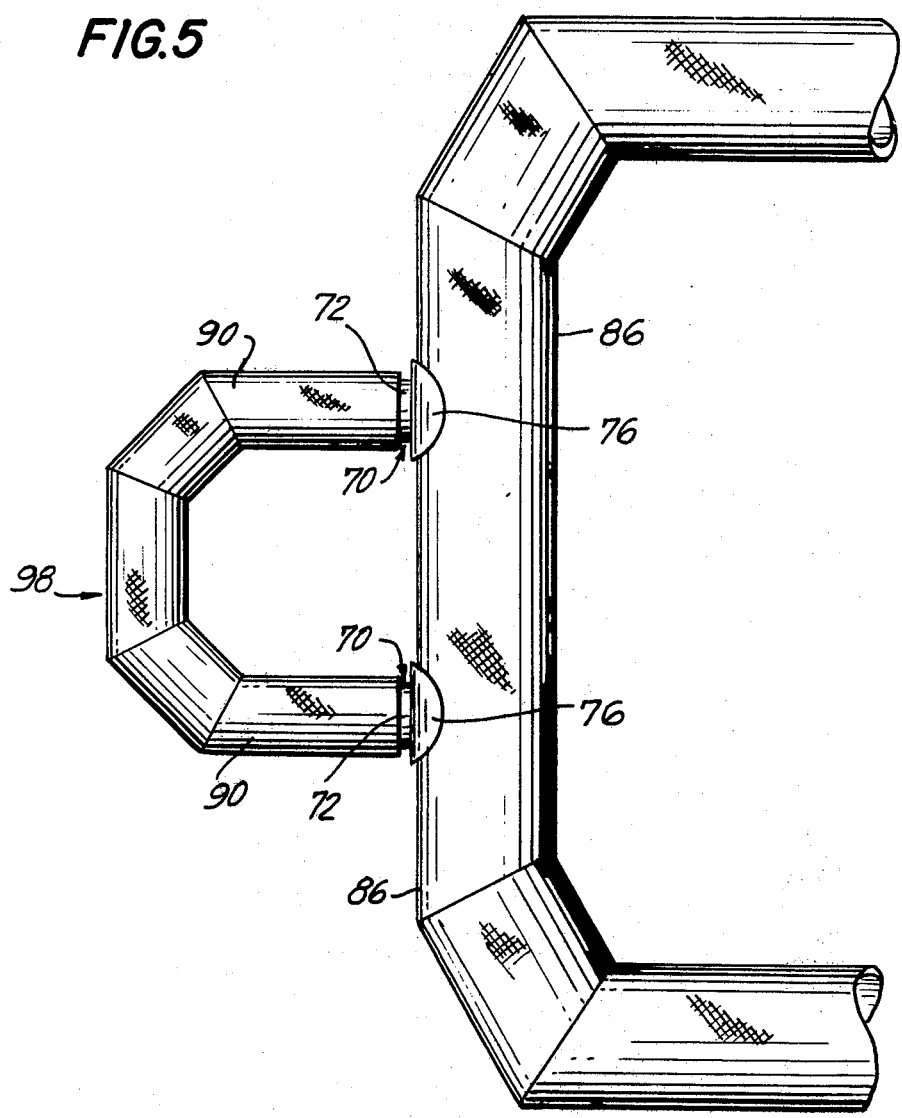

TRANSITION PIECE FOR USE IN INFLATABLE LIFE RAFTS

BACKGROUND OF THE INVENTION

1. Field of the Invention.

This invention relates to a new and improved transition piece for use in joining the tubular components of inflatable life rafts.

2. Description of the Prior Art

Although transition pieces for use in joining of the tubular components of inflatable life rafts are, of course, known in the prior art, the same will generally be found to be constituted by multi-piece assemblies of relatively complex configuration, the fabrication and attachment of which to the other tubular components of the inflatable life raft require relatively large amounts of time on the part of relatively skilled personnel to significant disadvantage in what is a particularly labor intensive industry. Too, the relative complexity of the prior art transition piece assemblies and of the manner in which the same are fabricated and attached to other tubular components of the inflatable life raft, give rise to the possibility of structural defects therein with attendant unacceptable consequences upon rapid inflation of the lift raft in an emergency situation at sea.

OBJECTS OF THE INVENTION

It is, accordingly, an object of this invention to provide a new and improved transition piece of unitary construction for use in inflatable life rafts.

Another object of this invention is the provision of a transition piece as above which is fabricatable in much more simple manner than those of the prior art to thus substantially reduce the labor costs inherent in such fabrication.

Another object of this invention is the provision of a transition piece as above which is utilazable in the construction of inflatable life rafts in much more simple manner than those of the prior art to thus substantially reduce the labor costs inherent in such construction by both reducing the amount of time required for transition piece utilization and making possible the employment of workers of lower skill, and thus lower wage levels for such utilization.

A further object of this invention is the provision of a transition piece as above which, because of the relatively simple manner in which the same is utilizable in the construction of inflatable life rafts, substantially reduces the possibility of error in such construction to thus result in greater reliability in a product area wherein the latter is of paramount importance as should be obvious.

SUMMARY OF THE DISCLOSURE

As disclosed herein, the new and improved transition piece of the invention is for use in the generally perpendicular connection of the tubular components of inflatable life rafts. The transition piece is of unitary construction and is preferably injection moulded from a material in the nature of neoprene rubber which is particularly adaptable to such formation and is particularly adaptable to reliable, fluidtight joinder with the neoprene coated nylon fabric from which said tubular life raft components are manufactured. The transition piece comprises a generally circular attachment flange of generally concave cross-section which is sized to mate perfectly with a tubular component of an inflatable life raft in the nature, for example, of a lower buoyancy tube. A suitable adhesive is used for the joinder of these components. Mating apertures are provided in the attachment flange and buoyancy tube to provide for the inflation and buoyancy of the life raft components which are connected to the buoyancy tube by the transition piece. A tubular body portion extends generally perpendicularly of the attachment flange and is sized to telescope perfectly into the tubular life raft component, for example a boarding ramp or arch support tube, which is to be connected to the lower buoyancy tube by the transition piece. Again, a suitable adhesive is used for joinder of these components.

The particularly significant advantages of the relatively simple transition piece of the invention include substantial reduction in the amount of time and level of skill required for transition piece utilization in the construction of an inflatable life raft with attendant substantial reduction in labor costs, and substantial reduction in the probability of defective inflatable life raft construction stemming from utilization of the transition piece.

DESCRIPTION OF THE DRAWINGS

The above and other significant objects and advantages of this invention are believed made clear by the following detailed description of the invention taken in conjunction with the accompanying drawings wherein:

FIG. 5 is a top elevational view illustrating a representative utilization of the transition piece of the invention in the construction of an inflatable life raft.

DETAILED DESCRIPTION OF THE INVENTION

Figure 1:
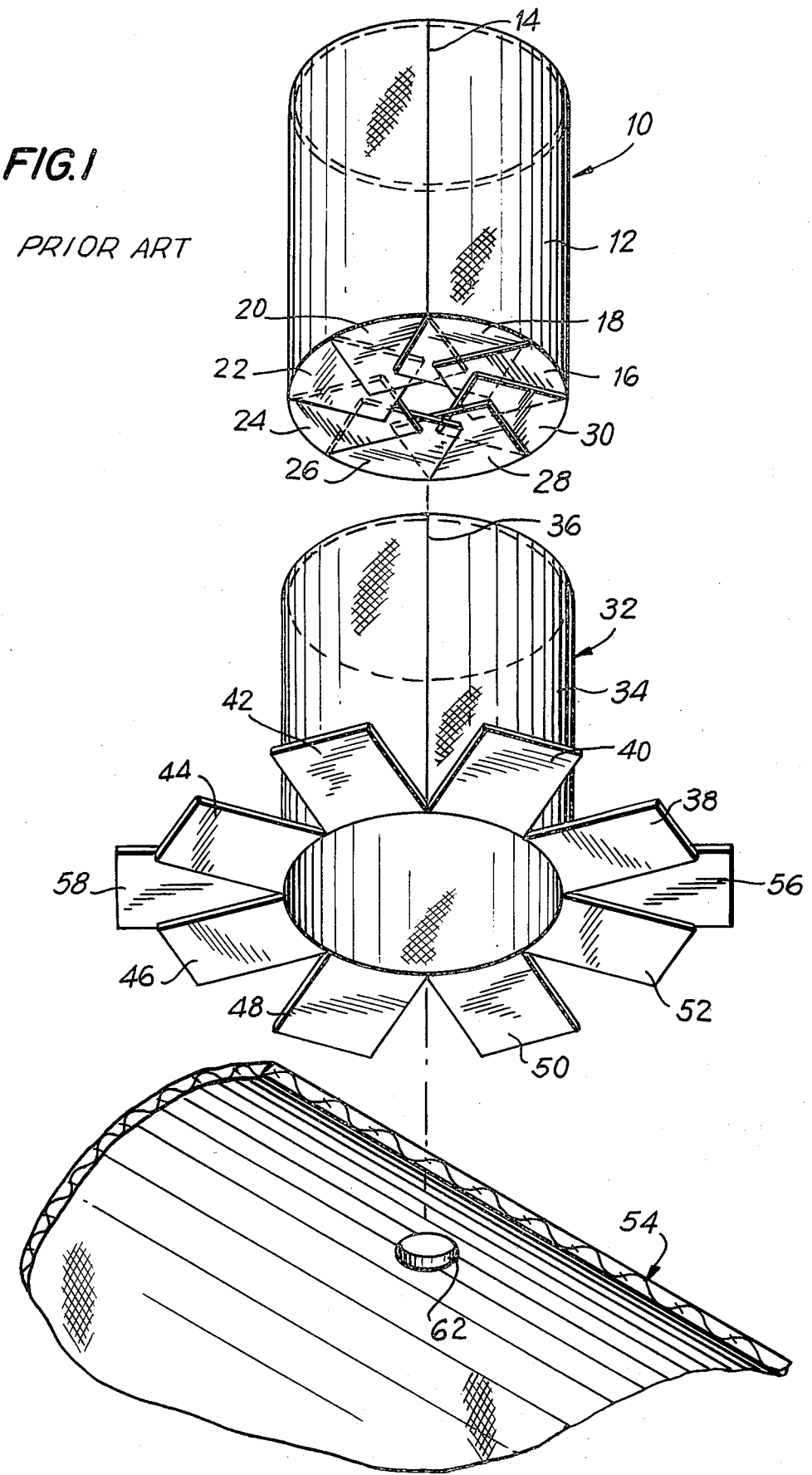
FIG. 1 is a fragmentary exploded perspective view illustrating the construction and utilization of a transition piece assembly in accordance with the prior art.
Figure 2:
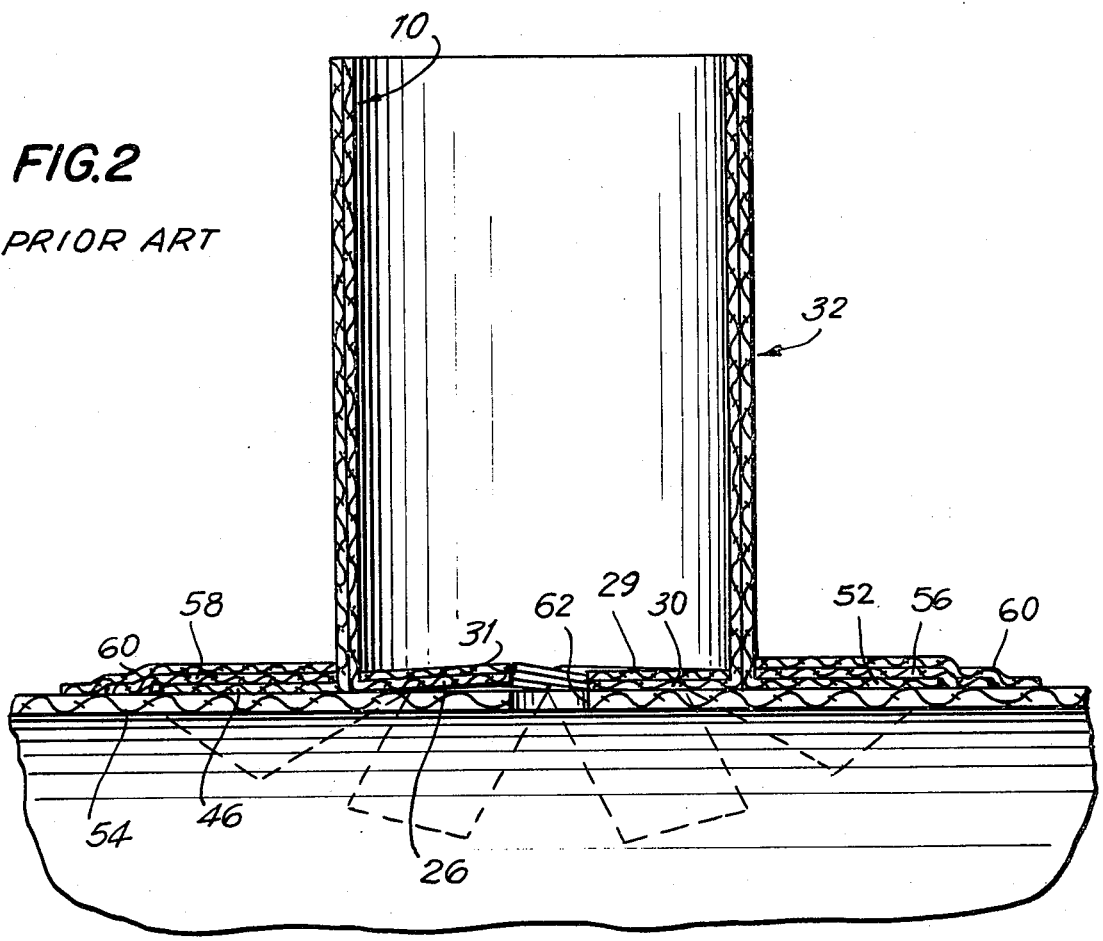
FIG. 2 is a cross sectional view taken through a transition piece-buoyancy tube assembly constructed in accordance with the prior art.

Referring now to FIGS. 1 and 2 which illustrate the construction and utilization of a transition piece assembly in the fabrication of an inflatable life raft in accordance with the prior art, the same may be understood to be commenced by the formation from a sheet 12 of a suitable material in the nature of a neoprene coated nylon fabric of an inner tubular member 10 as by the overlapping and joinder of the respective sheet edges in suitably fluid-tight manner as by gluing to form a seam 14. Following this, or before formation of the tubular member 10, generally equally spaced cuts and made in the lower edge of sheet 12 to form tabs 16, 18, 20, 22, 24, 26, 28 and 30 which are respectively bent inwardly as shown to lie generally perpendicularly to the tubular member 10 and in essence close off the bottom of the latter.

A second tubular member is indicated at 32 and may be understood to be formed substantially in the manner of tubular member 10 from a sheet 34 of like material to include a glued seam 36. Following this, or again before formation of tubular member 32 from sheet 35, generally equally spaced cuts are made in the lower edge to form tabs 38, 40, 42, 44, 46, 48, 50 and 52 which are respectively bent outwardly as shown generally perpendicularly of the tubular member 32. The inner diameter of tubular member 32 is predetermined to be substantially equal to the outer diameter of tubular member 10 to enable tight-fitting placement of the former around the latter as and for purposes described in detail hereinbelow.

A tubular member is indicated at 54 in FIG. 1 and may, for example, constitute the lower buoyancy tube of an inflatable life raft. Formation and utilization of the transition piece assembly of the prior art to enable the generally perpendicular attachment of for example, a boarding ramp tube or arch support tube to the lower buoyancy tube 52 is commenced by the individual application of a suitable adhesive to the lower surfaces of each of the tabs 16, 18, 20, 22, 24, 26, 28 and 30 of the tubular member 10 and the placement of the latter on the lower buoyancy tube 54 with said lower surfaces individually pressed into and maintained in firm contact with the surface of the buoyancy tube in the manner seen in FIG. 2 until such time as the adhesive has set. This will, of course, require not insubstantial manipulation of the tabs since the same are of course not rigidly disposed in the positions thereof depicted in FIG. 1.

An extra piece or strip of the same neoprene coated nylon fabric is then coated on the undersurface thereof with a suitable adhesive and applied over the juncture of each adjacent pair of the tabs to prevent "wicking" or the leakage of air through the fibers of the nylon fabric. To avoid over-complication of the drawings only two of these strips are illustrated as indicated at 29 and 31 in FIG. 2.

Following attachment as described of the tubular member 10 to the lower buoyancy tube 4, the attachment of tubular member 32 to the latter is commenced by coating the outer surface of tubular member 10 and/or the inner surface of tubular member 32 with a suitable adhesive and placing or telescoping the latter around tubular member 10. Tubular member 32 is then moved downwardly around tubular member 10 until the lower edge thereof contacts the outer surface of lower buoyancy tube 54. Thereafter, a suitable adhesive is individually applied to the lower surfaces of each of the tabs 38, 40, 42, 44, 46, 48, 50 and 52, and said lower surfaces are then individually pressed into and maintained in firm contact with the surrounding surface of lower buoyancy tube 54 until such time as the adhesive has set. An extra piece or strip which is again of the same neoprene coated nylon fabric is then coated on the undersurface thereof with a suitable adhesive and applied over the juncture or space between each adjacent pair of the tabs to prevent wicking. Again, over-complication of the drawings is avoided by the illustration of only two of such extra pieces or strips as indicated at 56 and 58, respectively, in FIGS. 1 and 2.

The attachment of the transition piece assembly of the prior art to lower buoyancy tube is completed by the application of an adhesive to the undersurface of a suitably apertured, generally circularly shaped doubler or collar 60 and the placement thereof around tubular member 32 as illustrated in FIG. 2 to overlie the respective tabs 38, 40, 42, 44, 46, 48, 50 and 52, the extra pieces or strips as exemplified by strips 56 and 58, and the adjacent outer surface portions of the lower buoyancy tube 54. Again, great care must be taken to avoid the smearing of excess adhesive over any of the exposed surfaces of the lower buoyancy tube 54, the tubular member 32 and/or the doubler or collar 60.

Following fabrication of the transition piece assembly of the prior art and attachment thereof to lower buoyancy tube 54 as described, an aperture 62 is cut through the wall of lower buoyancy tube 54 and the overlying portions of the tabs 16, 18, 20, 22, 24, 26, 28 and 30 to place the interior of the buoyancy tube in fluid flow communication with the interior of the transition piece assembly and enable the function of whatever is attached to the transition piece assembly as a buoyant life raft component as should be obvious. As an alternative to the above, the aperture 62 can be pre-formed in the lower buoyancy tube 54 and the tubular member 10 attached thereto as described in centrally aligned manner. Great care must, in either event, be exercised in cutting through the tabs to prevent dislodgement thereof from the lower buoyancy tube.

By the above is believed made clear that the fabrication and utilization of a transition piece assembly for use with inflatable life rafts in accordance with the prior art is a relatively complicated, time-consuming and expensive undertaking; and one which requires the best efforts of relatively skilled, and thus relatively highly paid consceientious personnel in order to insure that the structural integrity of the completed assembly meets the extremely rigid safety standards which are, of necessity, imposed by agencies in the nature of the U.S. Coast Guard on inflatable life rafts. More specifically, it may readily be understood that each and every of the above-described steps including the formation of the tubular members 10 and 32, the cutting of the respective tabs therein and the respective attachments thereof to the lower buoyancy tube, and the cutting of aperture 62, must all be accomplished with not inconsiderable care and precision in order to insure against fluid leakage through the finished assembly. In addition, not inconsiderable care must, of course, be undertaken in the application of the adhesive to the respective tabs and collar as described and the subsequent positioning and maintenance thereof for setting of the adhesive to insure that excess adhesive is not spilled and/or smeared over exposed buoyancy tube or transition piece assembly surfaces with resultant adherence thereof to each other and/or to other life raft surfaces when the life is deflated and collapsed for storage; it being believed clear that such adherence could in turn result in totally unacceptable structural damage, as by tearing a transition piece assembly or other life raft component destruction, upon the required extremely rapid (15–30 seconds) and forceful $CO_2$ system inflation of the life raft in an emergency situation at sea.

Figure 3:
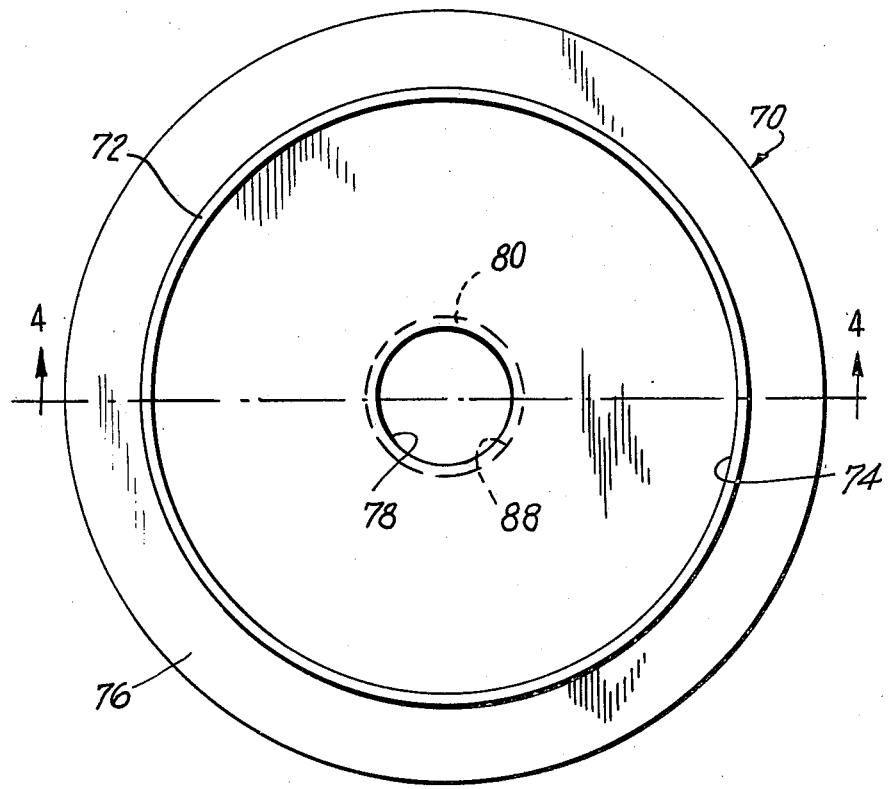
FIG. 3 is a top elevational view of a transition piece constructed in accordance with the teachings of this invention.
Figure 4:
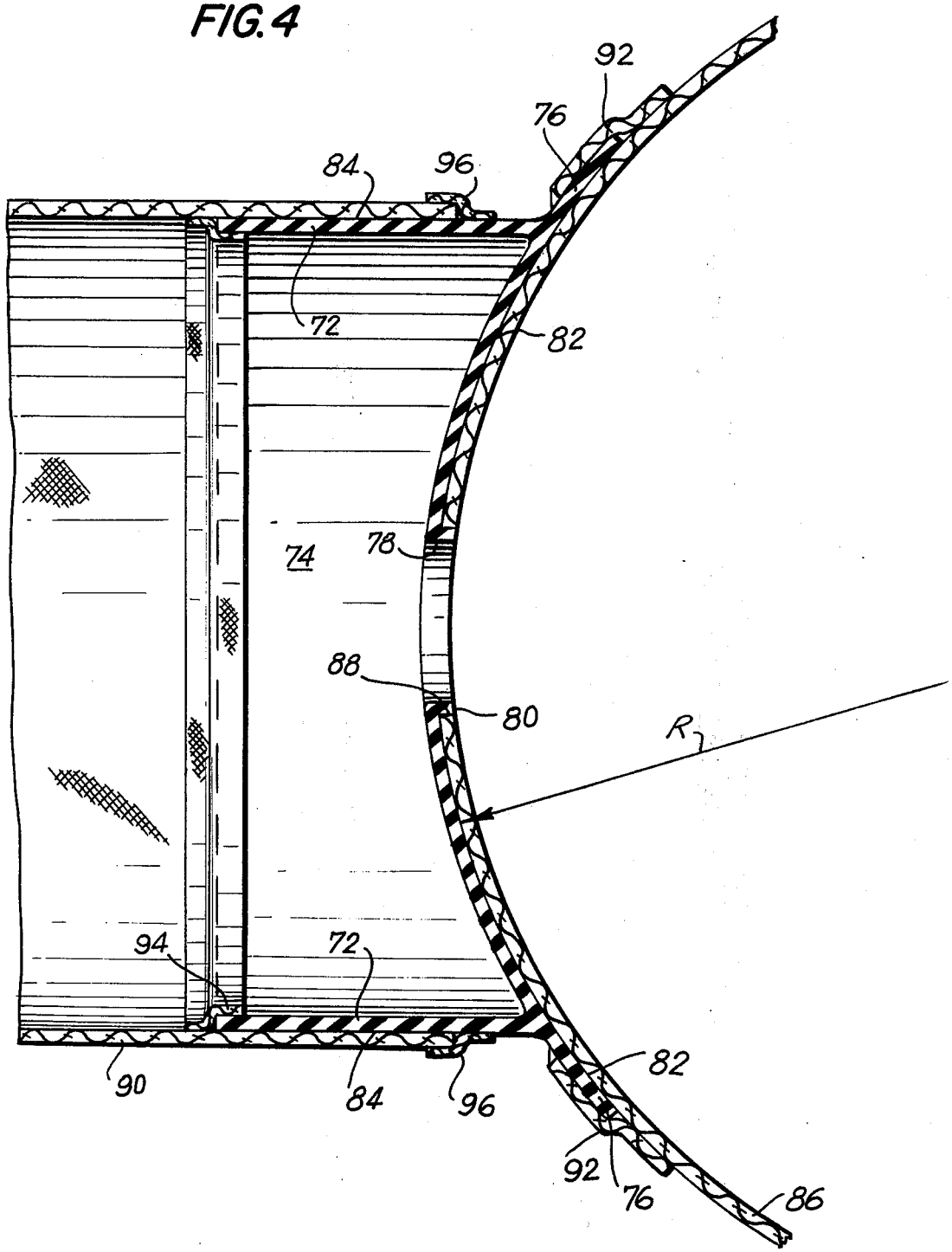
FIG. 4 is a cross sectional view taken along line 4—4 in FIG. 3.

Referring now to FIGS. 3 and 4 for the description of a transition piece constructed in accordance with the teachings of this invention for use in the construction of an inflatable life raft, the transition piece is indicated generally at 70 and may readily be seen to be of unitary construction. The transition piece 70 is preferably fabricated in a single step, as by injection moulding, from a suitable material in the nature of neoprene rubber which, since it contains no fibers—as does the neoprene coated nylon fabric from which the transition piece assembly of the prior art is made as described hereinabove—completely eliminates ab initio the problem of fluid leakage through the transition piece by wicking to significant advantage as should be obvious. In addition, and although the transition piece of the invention contains no fibers, it may be readily understood that the neoprene rubber from which the same is made has been conclusively proven by test to be more than strong enough for use in a transition piece, and to posess the further advantage of being particularly adaptable for permanent and absolutely reliable joinder to the neoprene coated nylon fabric material from which the major structural components of the life raft are made.

The transition piece 70 comprises a generally tubular body portion 72 which is open-ended at one extremity thereof as indicated at 74, and which terminates in an attachment flange 76 at the other extremity thereof. The attachment flange 76 is of generally circular configuration as viewed longitudinally of the transition piece 70 and is of generally concave configuration as viewed in cross section as clearly illustrated by FIG. 4. The radius R of the inner surface of the concavity of the attachment flange 76 is predetermined to be substantially equal to the radius of the outer surface of the tubular structural component of the inflatable life raft to which the attachment flange is to be joined in the manner described in detail hereinabove. In like manner, the diameter of the outer surface of the generally tubular body portion 72 is predetermined to be substantially equal to the diameter of the inner surface of the tubular structural component of the inflatable life raft to which said tubular body portion is to be joined in the manner also described in detail hereinbelow.

A generally circular aperture 78 is formed generally centrally of the attachment flange 76 to communicate the far side of the attachment flange with the interior of the generally tubular body portion 72, and a generally cylindrical flange 80 is formed as shown around said aperture to extend outwardly of the attachment flange in the manner of a rim.

Prior to utilization of the transition piece 70 of the invention, the respective outer surface 82 of the attachment flange 76 and the outer surface 84 of the generally tubular body portion 72 are roughened in any quick and convenient manner to provide for increased adhesive bonding thereto.

A tubular structural component of the inflatable life raft which may, for example, take the form of a lower buoyancy tube is indicated at 86 in FIG. 4 and may be understood to comprise a generally circular aperture 88 formed therein of diameter which is substantially equal to the outer diameter of the rim or flange 80 which surrounds transition piece aperture 78. Another tubular structural component of the inflatable life raft which may, for example, take the form of a boarding ramp or arch support tube is indicated at 90 in FIG. 4. For use of the transition piece 70 of the invention for the generally perpendicular attachment of the boarding ramp tube 90 to the lower buoyancy tube 86, it may be understood that a suitable adhesive is applied to the roughened outer surface 82 of the attachment flange 76 and the latter placed firmly and maintained on the lower buoyancy tube 86 as shown in such manner that the rim or flange 78 fits tightly into aperture 88 of the lower buoyancy tube. A collar or doubler 92, of the configuration described hereinabove and with a suitable adhesive applied to the undersurface thereof, is then placed firmly and maintained as illustrated around the tubular body portion 72 onto the lower buoyancy tube 86 to overlie the outer portion of the attachment flange 76 to complete, in two simple steps, the fluid-tight attachment of the transition piece 70 to the lower buoyancy tube upon setting of the adhesive.

The fluid-tight attachment of the boarding ramp or arch support tube 90 to the transition piece 70 is then readily accomplished by the application of a suitable adhesive to the roughened surface 84 of the tubular body portion 72 and the telescoping of the tube 90 thereover to the position of the latter depicted in FIG. 4. Setting of the adhesive is followed in this instance by the application as shown of a strip 94 of bias type to overlie the inner juncture of the tubular body portion 72 and the tube 90, and by the application as shown of a strip 96 of bias tape to overlie the outer juncture of these same components to thus insure the absolute fluid-tightness of the body portion-tube joinder, and complete the generally perpendicular attachment of the boarding ramp or arch support tube 90 to the lower buoyancy tube 86.

The fluid communication provided by the mating apertures 78 and 88 in the attachment flange 76 and the lower buoyancy tube 86 operates to enable the functioning of whatever tubular components of the inflatable life raft are attached to the lower buoyancy tube by the transition piece 70 as buoyant components of the life raft since, upon life raft inflation, the $CO_2$ will have free access to such components from the lower buoyancy tube through said apertures.

The many and significant advantages provided by the unitary transition piece 70 of the invention in comparison to the multi-piece transition piece assemblies of the prior art are believed made clear by the respective detailed descriptions thereof to include substantial reduction in the number of steps and the level of skill required for utilization of the former with attendant substantial reduction in labor costs, and equally substantial reduction in the probability of faulty construction of the inflatable life raft.

FIG. 5 illustrates the generally perpendicular attachment of a boarding ramp, as indicated generally at 98, to the lower buoyancy tube 86 of an inflatable life raft through use of two transition pieces 70 which are constructed and utilizable in accordance with the teachings of this invention as described in detail hereinabove.

Although described hereinabove by way of example as utilizable for the generally perpendicular connection of tubular life raft components in the nature of a boarding ramp tube or arch support tube to a lower buoyancy tube, it is believed clear that the transition piece 70 of the invention can and does function equally well in the connection of the other and different tubular inflatable life raft components.

Various changes may of course be made in the disclosed embodiment of my invention without departing from the spirit and scope thereof as defined by the appended claims.

What is claimed is:

1. A transition piece for use in the generally perpendicular joinder of the tubular components of inflatable life rafts comprising, a generally tubular body portion terminating at one extremity in a flange-less, tubular open end and terminating at the other extremity in an integral, generally circular attachment flange which extends generally perpendicularly thereof, said attachment flange including a flange portion which extends radially outward of the body portion and a flange portion which extends radially inward of the body portion so as to seal off at least a part of said other extremity, each of said radially outward and said radially inward extending attachment flange portions being of generally concave configuration as seen in cross section to adapt the same for joinder to the exterior of a tubular life raft component.

2. In a transition piece as in claim 1 wherein said tubular life raft component comprises an aperture formed in the wall thereof, and wherein said radially inward extending portion of said attachment flange comprises an aperture formed therein of a size which generally corresponds to the size of said component aperture to provide for the mating of said apertures and fluid communication between the respective interiors of said generally tubular body portion and tubular component upon joinder of said transition piece to said tubular component.

3. In a transition piece as in claim 1 wherein said open ended extremity of said tubular body portion is of a diameter which generally corresponds to the diameter of a tubular life raft component to be joined thereto whereby said extremity may be telescoped into and joined to said component.

4. In a transition piece as in claim 1 wherein said tubular life raft components are formed from a neoprene rubber coated nylon fabric, and wherein said transition piece is formed from neoprene rubber to render the same readily joinable to said components through use of a suitable rubber adhesive.

5. In a transition piece as in claim 2 wherein said radially inward extending portion of said attachment flange includes an integral lip surrounding said aperture and adapted to extend into said aperture in said tubular component to locate said transition piece relative to said component.

* * * * *